June 27, 1939.  J. G. RIETFORT  2,164,222
EGG TRANSFER DEVICE
Filed July 6, 1937  3 Sheets-Sheet 1
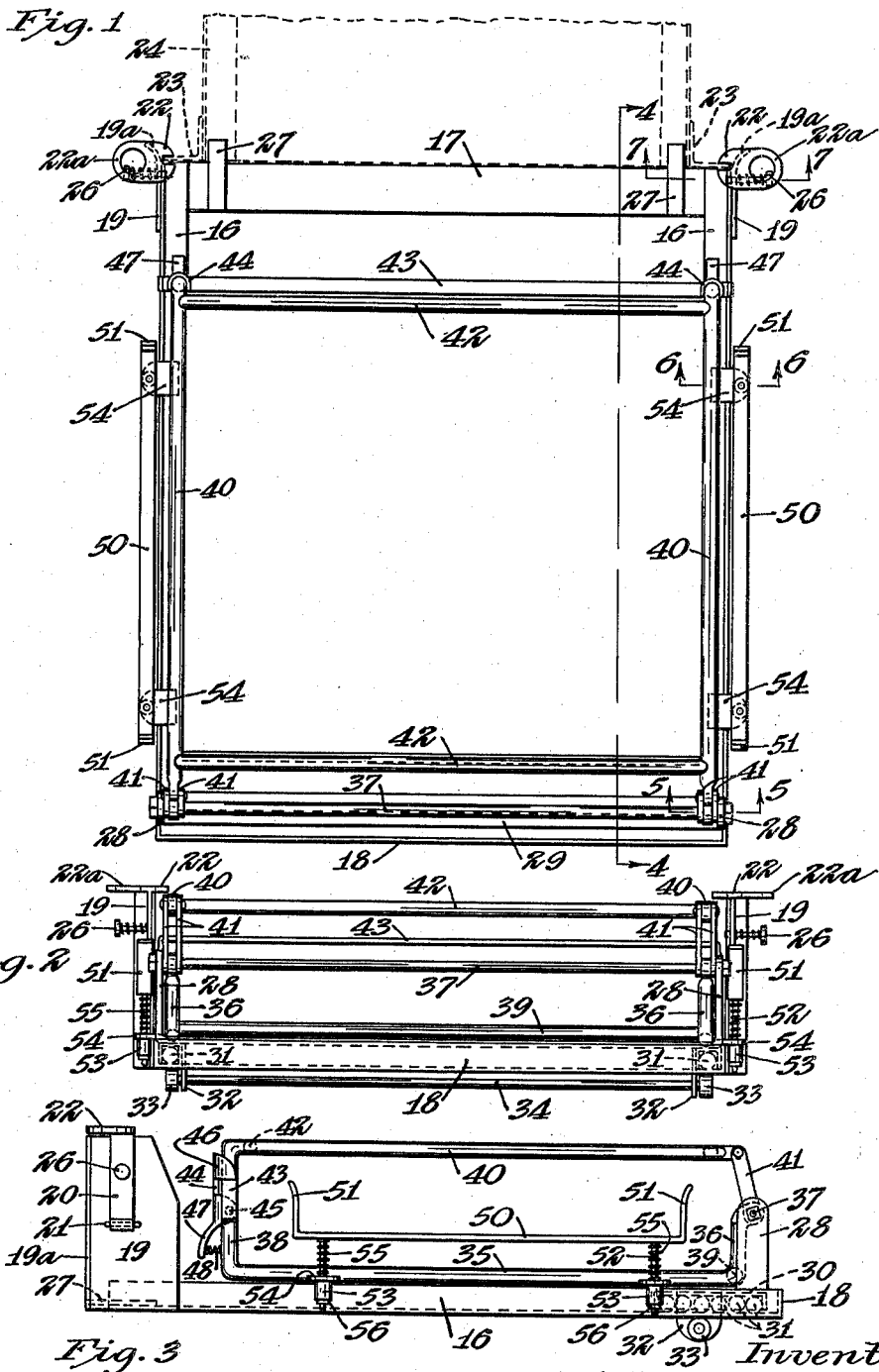
Inventor
John G. Rietfort
By Stryker & Stryker
Attorneys June 27, 1939.　　　　J. G. RIETFORT　　　　2,164,222
EGG TRANSFER DEVICE
Filed July 6, 1937　　　　3 Sheets-Sheet 2
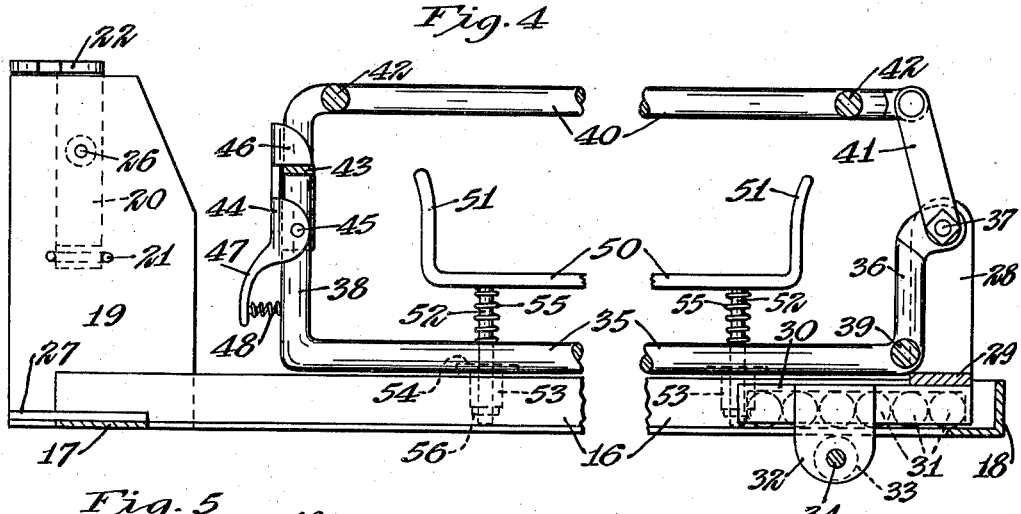
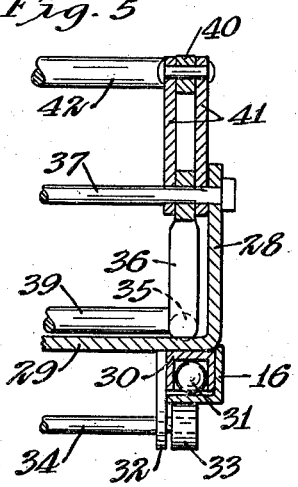
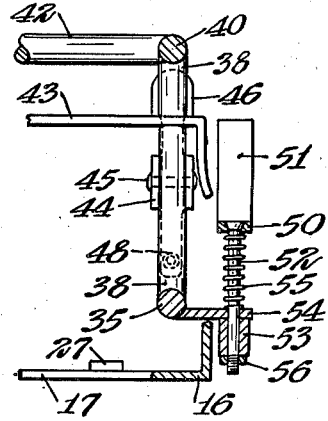
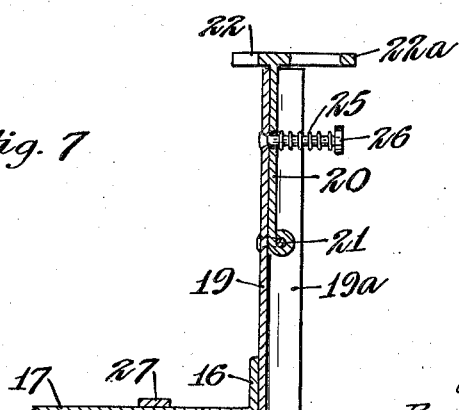
Inventor
John G. Rietfort
By Stryker & Stryker
Attorneys June 27, 1939.　　　J. G. RIETFORT　　　2,164,222
EGG TRANSFER DEVICE
Filed July 6, 1937　　　3 Sheets-Sheet 3
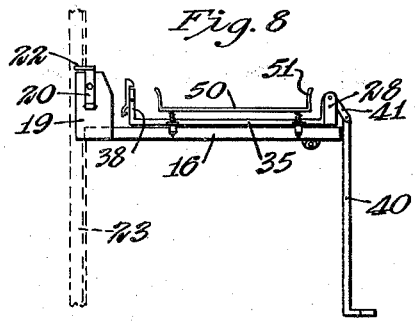
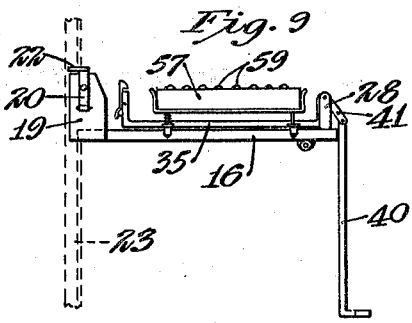
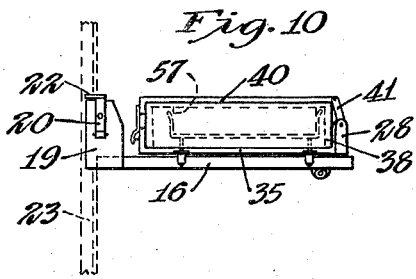
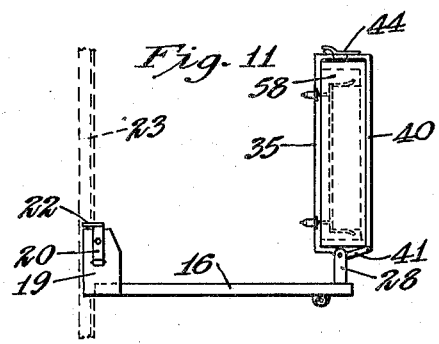
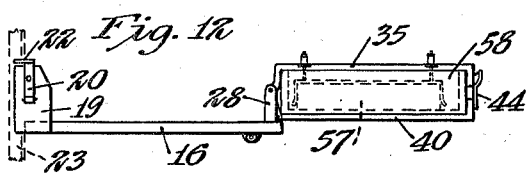
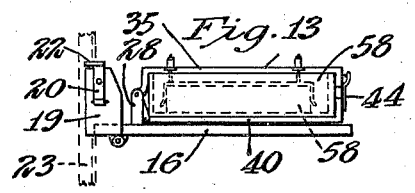
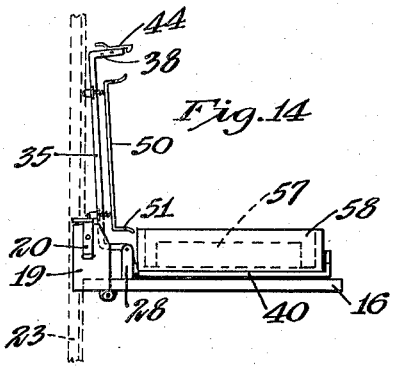
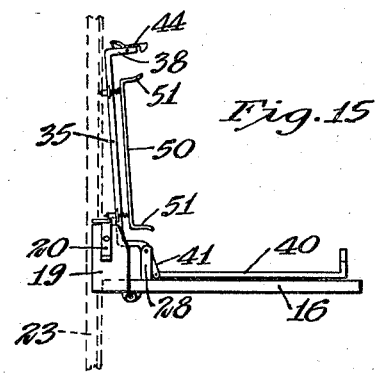
Inventor
John G. Rietfort
By Stryker & Stryker
Attorneys Patented June 27, 1939

2,164,222

UNITED STATES PATENT OFFICE 2,164,222

EGG TRANSFER DEVICE

John G. Rietfort, Waseca, Minn.

Application July 6, 1937, Serial No. 152,201

10 Claims. (Cl. 226—14)

This invention relates to a device for transferring eggs from one tray to another. In modern hatcheries, at a predetermined stage in the period of incubation, the eggs must be transferred from the smaller incubator trays to the larger hatcher trays. Heretofore, this work has required the services of two workmen in order to hold the long and somewhat flexible trays of unequal size in properly nested and fixed relation to each other while both trays are inverted. The difficulties attendant upon doing this work by old methods are such that breakage of eggs has often occurred and so much time is consumed that the eggs have sometimes been damaged by chilling.

It is my object to provide novel mechanism for securely holding egg trays of different sizes in proper relation to each other while inverting them together with the eggs contained therein.

A further object is to provide mechanism whereby a single operator can safely, quickly and easily transfer eggs from the smaller incubator trays to the larger hatcher trays.

Other objects are to provide egg transfer apparatus which automatically adjusts itself to eggs of various sizes, securely holds the eggs and both trays against relative movement and greatly reduces the danger of breaking eggs during their transfer from one tray to another.

Referring to the accompanying drawings which illustrate the best form of my invention at present known to me:

Figure 1 is a plan view of my device, with a portion of the supporting hatcher rack shown in dotted lines;

Figs. 2 and 3 are end and side elevations respectively of the device;

Fig. 4 is an enlarged section taken on the line 4—4 of Fig. 1;

Figs. 5, 6 and 7 are enlarged fragmentary sections taken respectively on the lines 5—5, 6—6 and 7—7 of Fig. 1, and Figs. 8 to 15 inclusive are diagrammatic illustrations of the successive steps in the operation of the device.

The device has a rigid frame consisting of a pair of spaced, parallel rails 16 connected at one end by a flat bar 17 and at the other end of the device by an angle bar 18. Rigidly secured to the outer faces of the rails 16 is a pair of bracket members 19 which project upwardly and have spring-pressed latch bars 20 pivotally secured thereto by hinge pins 21. Dogs 22 are fixed on the upper ends of the bars 20 and are notched to engage angle bars 23 extending vertically at the sides of a tray rack 24 (Fig. 1). As shown in Figs. 1 and 7, the front edges of the brackets 19 are bent obliquely outward to facilitate centering the frame of my device on the hatcher rack 24. The latch bars 20 are pressed inward by coiled springs 25 confined on guide pins 26 which are secured at their inner ends to the bracket members 19, as indicated in Figs. 4 and 7. The dogs 22 have front cam surfaces to facilitate moving them into engagement with the angle bars 23 and also have handles 22a to facilitate moving them out of engagement with the bars 23. Rigid fingers 27 project horizontally from the bar 17 to rest on one of the shelves or on a horizontal member of the rack 24 at a point within convenient reach of the hatcher trays to be filled with eggs.

As best shown in Figs. 4 and 5, a pair of hinge brackets 28 extend upwardly from a horizontal bar 29 which is slidable along the rails 16. Rigidly secured to each end of the bar 29 is a ball housing 30 containing a plurality of anti-friction balls 31 which are confined in the housing 30 and run on the upper surface of the adjacent rail 16. Each of the housings 30 has an ear 32 projecting downwardly therefrom at the inner edge of the adjacent rail 16 to support a roller 33 engaging the bottom surface of the same rail 16. The rollers 33 are mounted on the ends of a rod 34 connecting the ears 32 together. In this manner, I provide a carriage for the hinge brackets 28 which is movable along the rails 16 on the anti-friction balls 31.

As best shown in Figs. 3 and 4, a pair of normally horizontal, tray holding members 35 have upturned ends 36 which are pivotally joined to the bracket members 28, being swiveled on a horizontal rod 37 joining said bracket members together. Ends 38 of the members 35 extend in parallel relation to the ends 36 and the members 35 are joined by a rigid cross rod 39. Disposed opposite to each of the members 35 (when in use) is a parallel member 40 which is pivotally connected to the rod 37 near one of the bracket members 28 by a pair of links 41. The members 40 are rigidly joined together by a pair of cross rods 42 and a flat bar 43. The latter is arranged to be detachably secured to the ends 38 by a pair of latches 44 pivotally supported on pins 45 and having dogs 46 adapted to engage the upper surface of the bar 43, as best shown in Fig. 4. Each latch 44 has a handle 47 and is urged by a spring 48 to normally hold the dog 46 in engagement with the bar 43.

A pair of inner tray holders 50 are mounted on the members 35 and have fingers 51 projecting in spaced and substantially parallel relation to the ends 36 and 38 of the members 35. These fingers 51 are so spaced apart as to fit against the outer side walls of the incubator trays. As best shown in Figs. 1 and 6, each member 50 is supported on a pair of normally vertical rods 52 which are slidable longitudinally in bearings 53. These bearings are integral with small brackets 54 projecting horizontally from the members 35 and rigidly secured thereto. To resiliently support the cradle member 50, coiled springs 55 are confined on the rods 52 above the brackets 54. Upward movement of the rods 52 in the bearings 53 is limited by nuts 56 severally threaded on the lower ends of the rods 52.

In Figs. 9 to 14, inclusive, one of the smaller incubator trays is indicated by the numeral 57 and one of the larger hatcher trays by the number 58. These trays are shown in end view and it will be understood that they are rectangular and more than twice as long as they are wide. The incubator trays readily nest within the hatcher trays and the eggs 59 normally project from the top of the former, as indicated in Fig. 9. Usually, more than one hundred eggs are contained in each tray.

Operation

My device is designed for attachment to a tray rack, such as the hatcher tray rack 24 indicated in dotted lines in Fig. 1, and having the vertical angle bars 23 at opposite sides of the front. To attach the device to such a rack the pair of fingers 27 are inserted above one of the shelves or horizontal bars at the front of the rack 24 with the rails 16 sloping downward away from the rack. Now, by merely raising the outer ends of the rails 16 to horizontal position, the dogs 22 are caused to snap into engagement with the angle bars 23 and thereby securely attach my device to the rack. Assuming that the tray holding members 40 are in their closed position indicated in Fig. 4, these members must be moved to the open position indicated in Fig. 8 to receive the egg trays. This is done after manipulating the latches 44 to release the bar 43 and then an incubator tray 57, containing the eggs to be transferred, is placed between the pairs of fingers 51 on the members 50, as indicated in Fig. 9. Now the larger and empty hatcher tray 58 is placed in inverted position on the eggs in the tray 57 and with the sides of the tray 58 confined between the pairs of ends 36 and 38 of the members 35. The tray 58 is next secured in this nested position by placing the members 40 across the top thereof and securely fastening them by engaging the dogs 46 of the latches 44 with the bar 43, as indicated in Fig. 10. After this is done the operator pivots the assembled trays, with the rod 37 as a center, successively to the positions indicated in Figs. 11 and 12 and then actuates the brackets 28 along the rails 16 to the position indicated in Fig. 13, where the assembled trays and eggs are securely supported with the smaller tray 57 inverted and the larger tray 58 in upright position. As the next step, the latches 44 are manipulated to release the assembly, including the members 35 and 50, and the latter are swung back, out of the way, as indicated in Fig. 14. Finally, the inverted smaller tray 57 is removed, allowing the eggs to spread out in the larger hatcher tray 57 which is placed in the hatcher rack 24. The foregoing operation is repeated for each tray, after returning the apparatus to the position indicated in Fig. 8.

My device is adapted for use with eggs of various sizes by reason of my arrangement for resiliently and adjustably supporting the inner tray holding members 50 so that these members firmly retain the eggs, irrespective of size, against the inverted bottom of the hatcher tray. The eggs are thus prevented from moving relative to the trays as they are turned or inverted together with the trays and, as the trays are also securely held against shifting one relative to the other, the device constitutes an excellent safeguard against breakage of the eggs. It further enables a single, relatively unskilled operator to transfer the eggs and turn the large trays of different sizes in shorter time and with less physical effort than heretofore required.

Having described my invention, what I claim as new and desire to protect by Letters Patent is:

1. In a device of the class described, a substantially horizontal frame, a carriage movably secured to said frame, a large tray holder pivotally connected to said carriage, means including members adapted to extend across the top and sides of said tray for securing the same in said holder, and a holder for a smaller tray mounted in spaced relation to said members of said large tray holder to retain a tray of eggs in nesting relation to said large tray holder.

2. In a device of the class described, a pair of spaced parallel rails, a carriage movable along said rails, a large tray holder pivotally connected to said carriage, means including members adapted to extend across the top and sides of said tray for detachably securing the same in said holder, and a holder for a smaller tray mounted in spaced relation to said members of said large tray holder to retain a tray of eggs in nesting relation to said large tray.

3. In a device of the class described, a substantially horizontal frame, means for detachably securing said frame to a tray rack, a carriage movable on said frame, a large tray holder pivotally connected to said carriage, means including members adapted to extend across the top and sides of a tray for securing the same in said holder, and a holder for a smaller tray mounted on said large tray holder, in spaced relation to said members thereof to retain a tray of eggs in nesting relation to a large tray on said first mentioned holder.

4. In a device of the class described, a substantially horizontal frame, a carriage movably secured to said frame, a large tray holder pivotally connected to said carriage, means for detachably securing a tray in said holder and a holder for a smaller tray mounted on said first mentioned holder and formed to retain a tray of eggs in nesting relation to a tray in said larger holder, said connection between said holders and carriage permitting the trays to be inverted by pivoting the holders thereof on said carriage and said carriage being movable to support said holders in inverted position on said frame.

5. In a device of the class described, a pair of spaced, parallel and substantially horizontal rails, means for detachably securing an end of said rails to a tray rack, a carriage movable along said rails, a large tray holder pivotally connected to said carriage, means for detachably securing a tray on said holder and a holder for a smaller tray resiliently supported on said first mentioned holder and formed to retain a tray of eggs in nesting relation to a tray on said larger holder, said connection between the holders and carriage permitting the trays to be inverted by pivoting the holders relative to the carriage and said carriage being movable to support said holders in inverted position on said rails.

6. A device for transferring eggs from one tray to another, one of said trays being substantially larger than the other and each being adapted to contain a single layer of eggs, comprising, a holder for the larger tray having members adapted to confine the top, bottom and opposite side walls of said tray and a cradle for said smaller tray supported on said holder and having members for engaging opposite side walls of the smaller tray and for spacing at least one of said walls from the adjacent wall of a larger tray confined on said holder, said holder and cradle being invertible together with the trays held thereby as a unit.

7. In a device for transferring eggs from one substantially rectangular tray to another, each of said trays being adapted to contain a single layer of eggs and one of said trays being substantially larger than the other and having side walls of substantially greater height than those of the smaller tray, a holder for the larger tray having members for confining the top, bottom and opposite side walls of said tray, a cradle for said smaller tray supported on said holder and supporting the bottom of the smaller tray in a plane intermediate the top and bottom of the larger tray and means for removably securing said larger tray in the embrace of said holder.

8. In a device for transferring eggs from a smaller to a larger tray, each of said trays being adapted to contain a single layer of eggs, a fixed support, a holder for the larger tray pivotally connected to said support and having members adapted to engage the top, bottom and opposite side walls of said tray, means removably connecting the top-engaging member to the bottom-engaging member of said holder, a cradle for said smaller tray positioned within said holder to maintain the top surfaces of eggs in the smaller tray against the inside bottom surface of the larger tray on the holder and means for spacing a side wall of the smaller tray from the adjacent side wall of the larger tray on said holder, said holder, cradle and trays being invertible as a unit by pivoting the same on said support.

9. A device for transferring eggs from one tray to another, one of said trays being substantially larger than the other and each being adapted to contain a single layer of eggs, comprising, a fixed support, a holder for the larger tray pivotally connected to said support and having members adapted to engage the top, bottom and opposite side walls of said tray, means removably connecting the top-engaging member to the bottom-engaging member of said holder and a cradle for said smaller tray resiliently supported on said holder to press the top surfaces of eggs in the smaller tray against the inside bottom surface of the larger tray on the holder, said holders and trays being invertible as a unit by pivoting the same on said support.

10. In a device for transferring eggs from a smaller to a larger tray, each of said trays being adapted to contain a single layer of eggs, a holder for the larger tray having members adapted to engage the top, bottom and opposite side walls of said tray, means removably connecting the top-engaging member to the bottom-engaging member of said holder, a cradle for said smaller tray supported on said first mentioned holder and means for resiliently pressing the top surfaces of eggs in the smaller tray against the inside bottom surface of the larger tray on the holder, said holder, cradle and trays being invertible as a unit and said holder and cradle confining said trays and eggs against relative movement.

JOHN G. RIETFORT.